United States Patent Office.

C. W. LANGWORTHY, OF BERGEN, NEW JERSEY.

Letters Patent No. 91,455, dated June 15, 1869.

---

IMPROVED ROOFING-PAINT.

---

The Schedule referred to in these Letters Patent and making part of the same.

---

*To all whom it may concern:*

Be it known that I, C. W. LANGWORTHY, of Bergen, Hudson county, New Jersey, have invented a new and improved Roofing-Paint; and I do hereby declare that the following is a full, clear, and exact description thereof, which will enable others skilled in the art to make and use the same.

This invention relates to a new fire-proof compound, which is to be more particularly used for painting roofs, but which may also be used on other places where fire-proof compounds are required.

The paint is composed of the following ingredients, in about the proportions specified, to wit:

Ten parts of oxide of iron, or peroxide of iron.
Three parts of hydraulic lime or cement.
Two parts of soapstone.
Five parts of gypsum.

The oxide of iron and the hydraulic cement, or lime, are first mixed with raw or distilled coal-tar, which is heated while mixing. When the heated compound has about the consistency of molasses, the soapstone and gypsum are added.

The paint is now ready for use, and can be used on felt roofs, shingles, metal, or wood, wherever needed. It is applied by means of a brush, or otherwise.

This paint will protect wood from decay, tin, and other metal from corrosion. Felt and wood it will make almost entirely fire-proof. It is, therefore, of great advantage on all parts of buildings.

It may, however, also be used in barrels, tanks, casks, &c., to make them water-tight. The gypsum and soapstone may be omitted, or their respective equivalents substituted.

I propose to call this composition "Langworthy's oxide-of-iron cement."

I claim as new, and desire to secure by Letters Patent—

The composition herein described, when compounded of the ingredients substantially in the manner herein specified.

C. W. LANGWORTHY.

Witnesses:
    FRANK BLOCKLEY,
    ALEX. F. ROBERTS.